United States Patent
Varteva et al.

(10) Patent No.: US 9,304,942 B2
(45) Date of Patent: Apr. 5, 2016

(54) SECURITY CONFIGURATION FOR MEMORY ACCESS CONTROL

(75) Inventors: Jaakko Varteva, Veikkola (FI); Joni Jantunen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 766 days.

(21) Appl. No.: 12/956,606

(22) Filed: Nov. 30, 2010

(65) Prior Publication Data
US 2012/0137043 A1     May 31, 2012

(51) Int. Cl.
  *G06F 12/00* (2006.01)
  *G06F 12/14* (2006.01)
  *G06F 21/62* (2013.01)

(52) U.S. Cl.
  CPC ........ *G06F 12/1425* (2013.01); *G06F 21/6218* (2013.01); *G06F 2212/171* (2013.01)

(58) Field of Classification Search
  None
  See application file for complete search history.

(56) References Cited

U.S. PATENT DOCUMENTS

| | | | | |
|---|---|---|---|---|
| 2006/0242374 A1* | 10/2006 | Slater | ........................... | 711/163 |
| 2007/0034686 A1* | 2/2007 | Davis et al. | ................... | 235/380 |
| 2010/0161928 A1* | 6/2010 | Sela et al. | ...................... | 711/163 |
| 2010/0262139 A1* | 10/2010 | Beller et al. | .................... | 606/41 |
| 2010/0332813 A1* | 12/2010 | Rothman et al. | .................. | 713/2 |

* cited by examiner

Primary Examiner — Daniel Tsui
(74) Attorney, Agent, or Firm — Locke Lord LLP

(57) ABSTRACT

A system for controlling access to resources in an apparatus when the apparatus is not active. Emerging technologies may allow information to be accessed in an apparatus memory without the operating system of the apparatus facilitating the access. In such instances, a subsystem in the apparatus may become active upon reception of wireless signals, and may grant direct access to memory. An access control configuration for the subsystem may be implemented in order to control memory access even when other software systems are inactive. The subsystem access control configuration may be configured (e.g., by the user) when the apparatus is active, and may be established (e.g., installed or updated) upon subsystem activation.

23 Claims, 9 Drawing Sheets

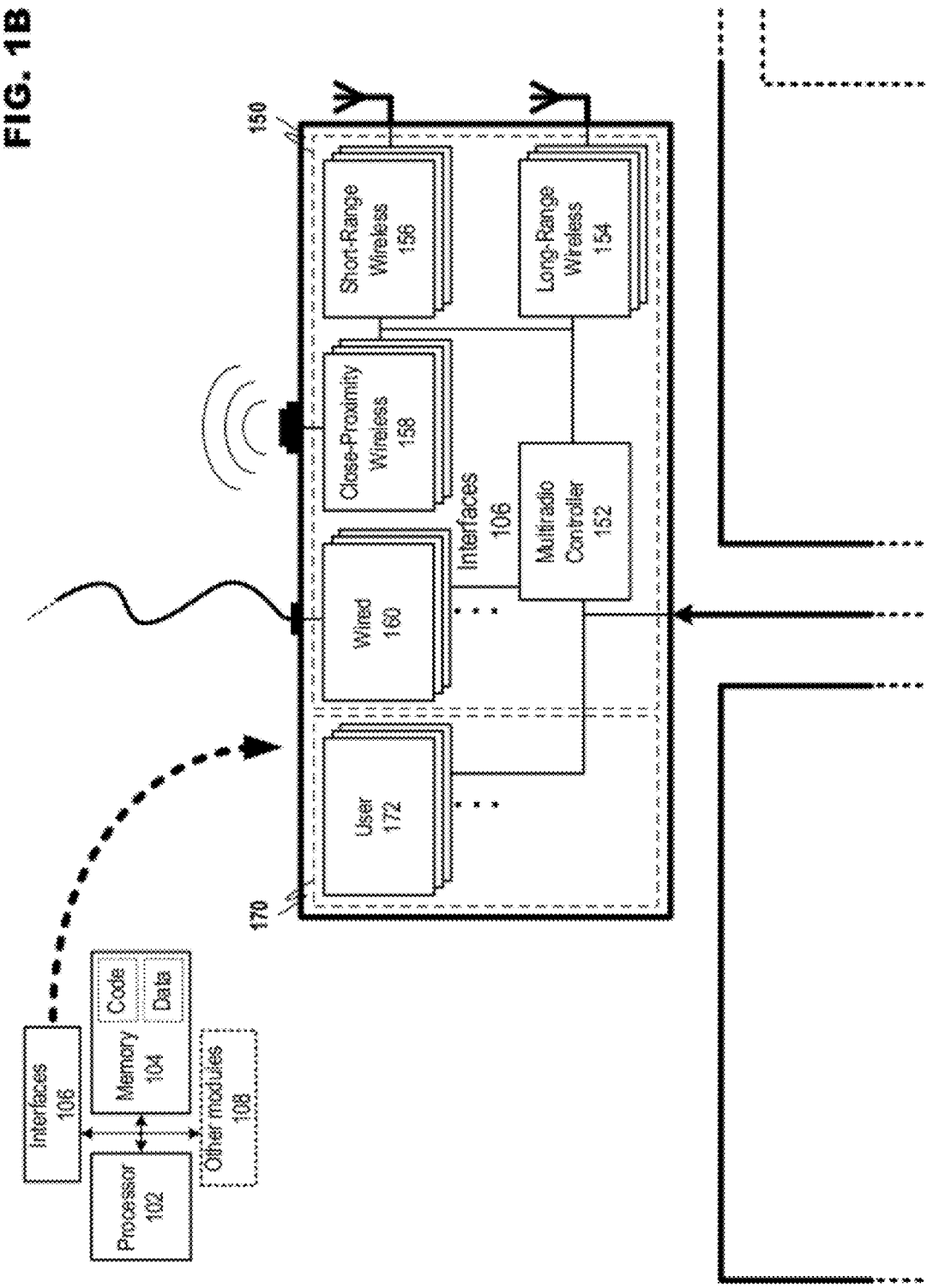

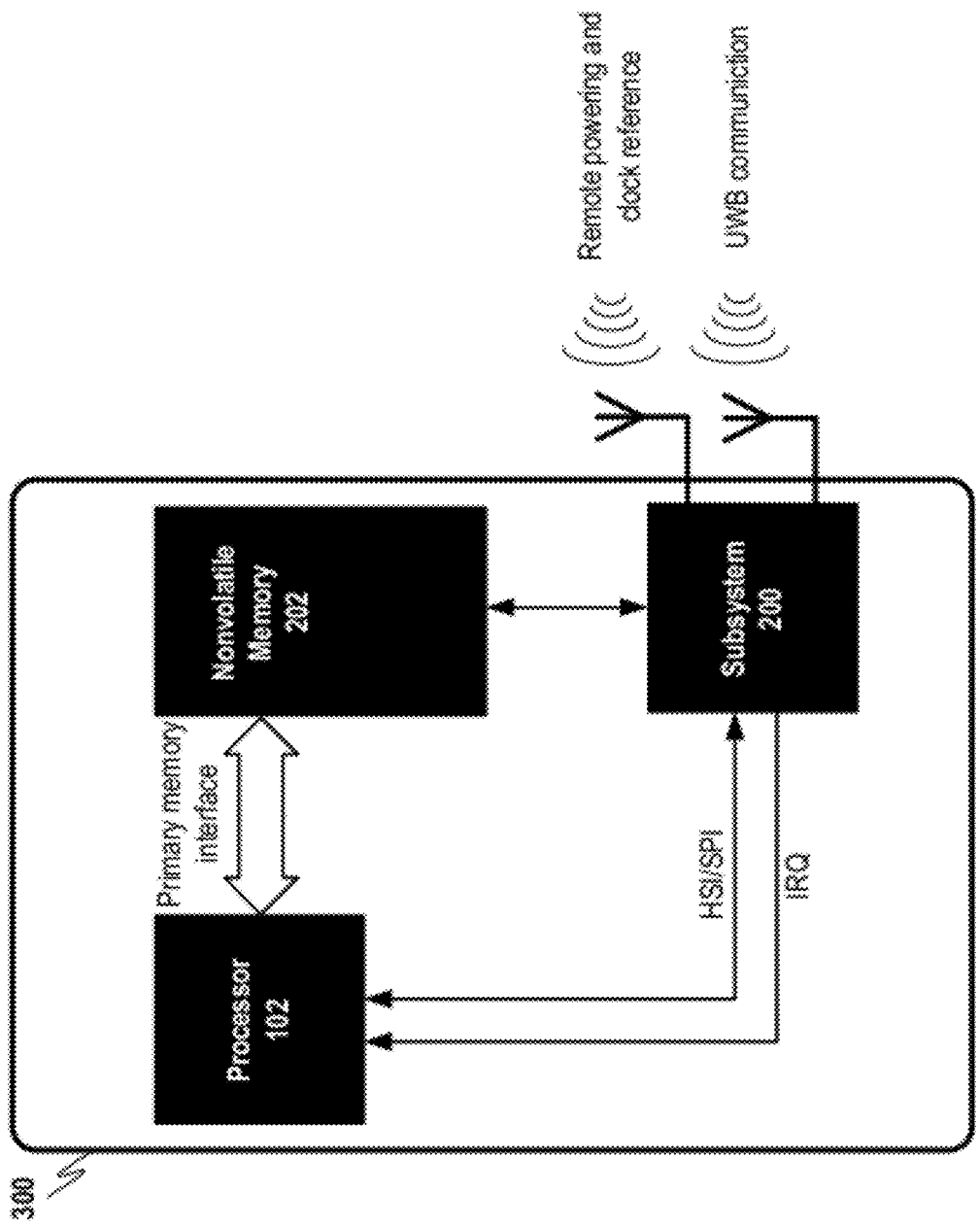

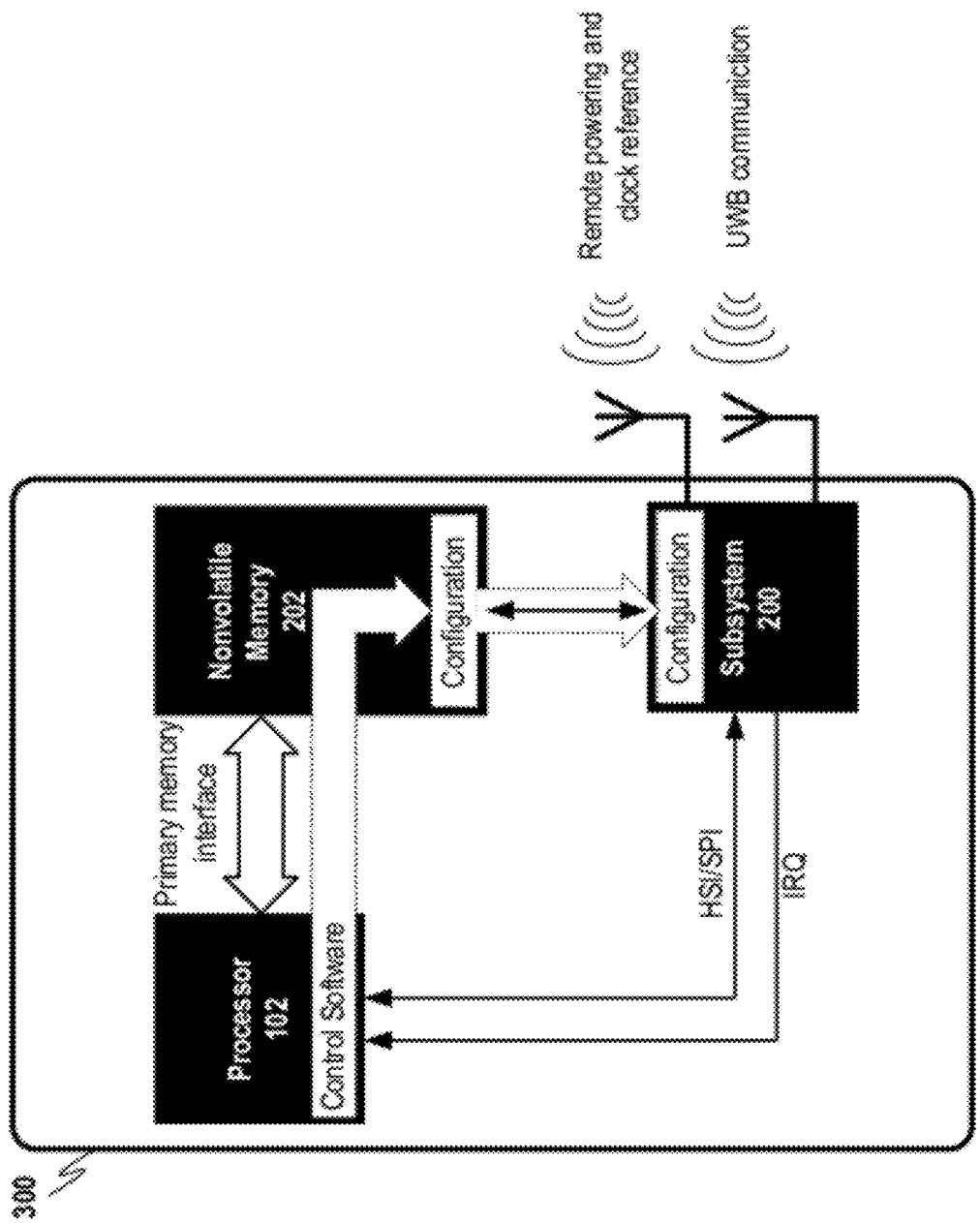

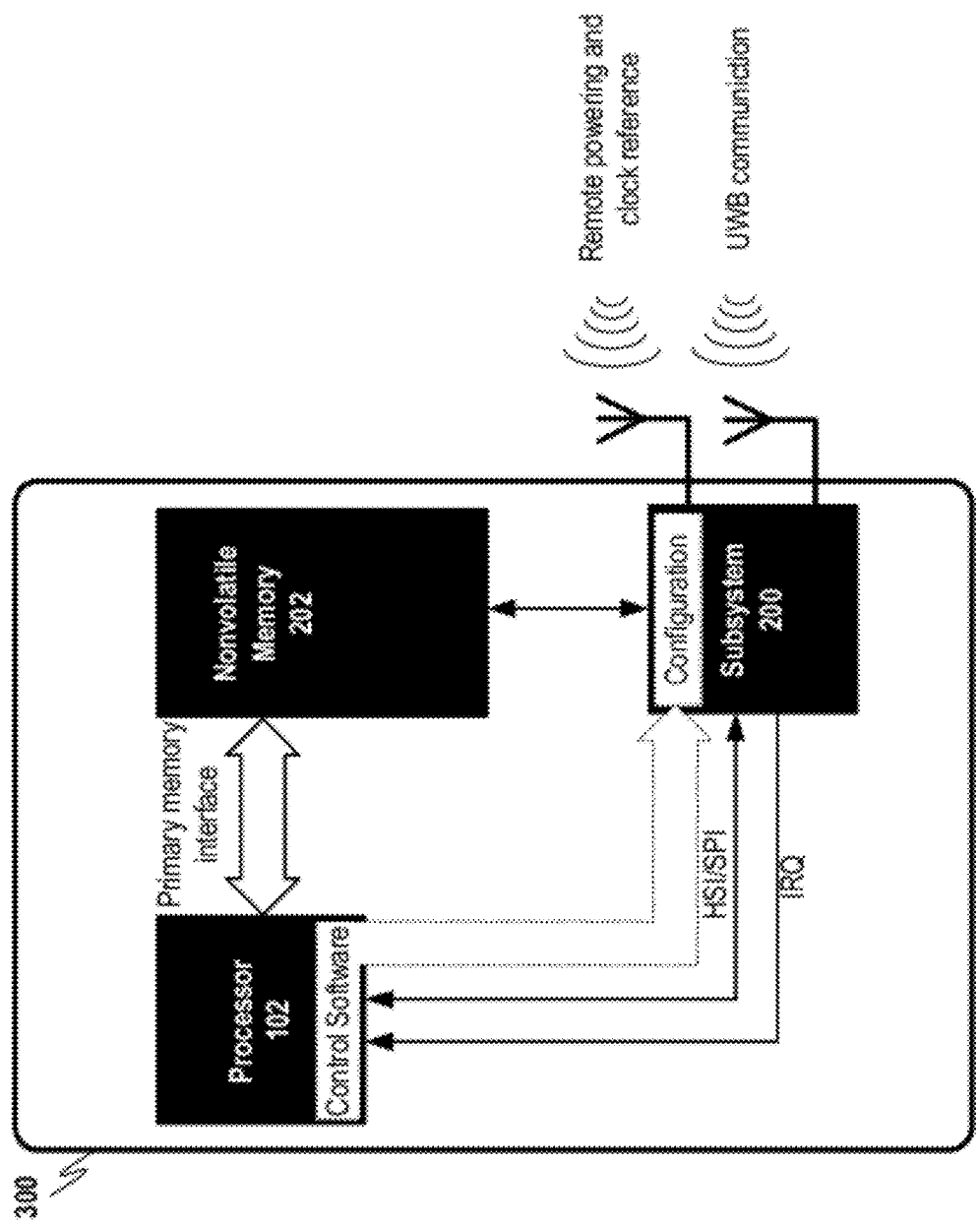

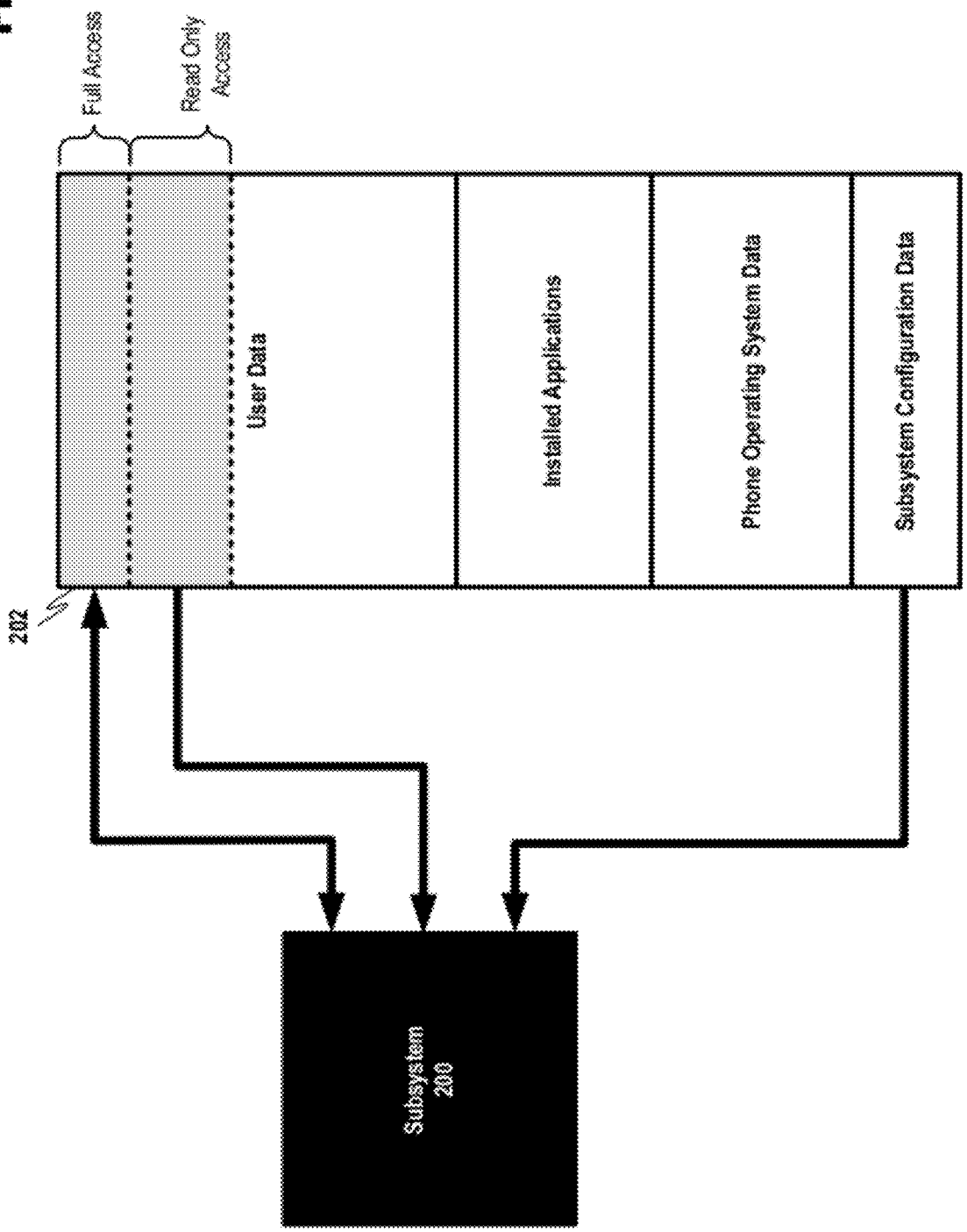

SECURITY CONFIGURATION FOR MEMORY ACCESS CONTROL

BACKGROUND

1. Field of Invention

The present invention relates to wireless communication, and in particular, to controlling access to apparatus resources when software-based protections may not be active.

2. Background

Emerging electronic apparatuses continue to attempt to incorporate many features into each device in order to satisfy consumer demand for enhanced functionality. These features may be implemented through hardware-based solutions, software applications, or may comprise a combination of both. For example, wireless communication functionality may be provided in apparatuses through a combination of physical layer (PHY) transceiver resources in conjunction with software-based communication modules that control message processing, packet formation, physical layer access control, security, quality of service (QoS), etc. During typical apparatus operation, software that comprises the apparatus operating system (OS) may work together with the wireless communication software and hardware to facilitate data transmission and reception.

As apparatuses continue to evolve, the reliance more on software than hardware may allow for further flexibility in application deployment. For example, a hardware platform that provides an "empty box" in which to implement various functionalities may allow for application revision, modification and expansion, which may further extend the usable life of apparatuses. Such architectures also allow for more accessibility along the apparatus production and delivery chain. Apparatuses experiencing issues that require software updates may not need to be returned to a facility for overhaul. Instead, it may be possible for devices to be updated by the distributor, by the seller, or possibly even by the user. Moreover, as technology develops it may be possible to eliminate the need for custom servicing equipment, or possibly even to eliminate all equipment as software may be updated wirelessly via short-range or long-range wireless communication.

In existing configurations, the wireless update of software information requires apparatuses to be active for controlling access to storage locations (e.g., non-volatile memories), while passive data retrieval (e.g., accessing data storage locations in an apparatus without having the OS facilitating the access) is mainly accomplished via wired communication or physically removing the memory from the apparatus. However, emerging technologies may allow wireless access to the memories of apparatuses without an apparatus being active. Such technology may support completely passive read and/or write transactions that may allow, for example, software updates for products (e.g., handsets and smartphones) without ever taking them out of the box.

SUMMARY

Various example embodiments of the present invention may be directed to a method, apparatus, computer program product and system for controlling access to resources in an apparatus when the apparatus is not active. Emerging technologies may allow information to be accessed in an apparatus memory without the operating system of the apparatus facilitating the access. In such instances, a subsystem in the apparatus may become active upon reception of wireless signals, and may grant direct access to memory. Without the operating system or other access control software being active in the apparatus, access to the memory may be unimpeded and may grant access to information vital to the operation of the apparatus, or to information that may be deemed sensitive or confidential to the apparatus user. In accordance with at least one embodiment of the present invention, an access control configuration for the subsystem may be implemented in order to control memory access even when other software systems are inactive.

The subsystem access control configuration may be configured (e.g., by the user) when the apparatus is active, and may be established (e.g., installed or updated) upon subsystem activation. For example, the access control configuration may be configured using configuration software and stored in the memory. Upon subsystem activation, the access control configuration may be read from the memory into the subsystem. It may also be possible for the access control configuration to be stored somewhere in the subsystem, for example, in an intermediary security component interposed between a subsystem communication component and the memory.

Access requests that are received in the subsystem, at least when operating in a direct access mode, may then be compared to the access control configuration, and access may only be granted if the access request is permitted by the access control configuration. The access control configuration may, for example, specify one or more ranges of memory addresses that may be accessed by the subsystem. Each of these ranges of memory addresses may further be specified as having "read-only" access or "read-write" access. In some instances, the grant of access to the memory may involve the communication component sending a request for access to the intermediary security component. Upon being granted access, the subsystem may transmit a success notification via wireless communication. Likewise, an access failure notification may be sent via wireless communication if access to the memory is denied by the subsystem.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 3 discloses an example subsystem configuration in accordance with at least one embodiment of the present invention.

FIG. 4A discloses an example of configuring an access control configuration and establishing the access control configuration in an access subsystem in accordance with at least one embodiment of the present invention.

FIG. 4B discloses an alternative example of configuring an access control configuration and establishing the access control configuration in an access subsystem in accordance with at least one embodiment of the present invention.

FIG. 5 discloses an example memory configuration in accordance with at least one embodiment of the present invention.

DESCRIPTION OF EXAMPLE EMBODIMENTS

Figure 1A:
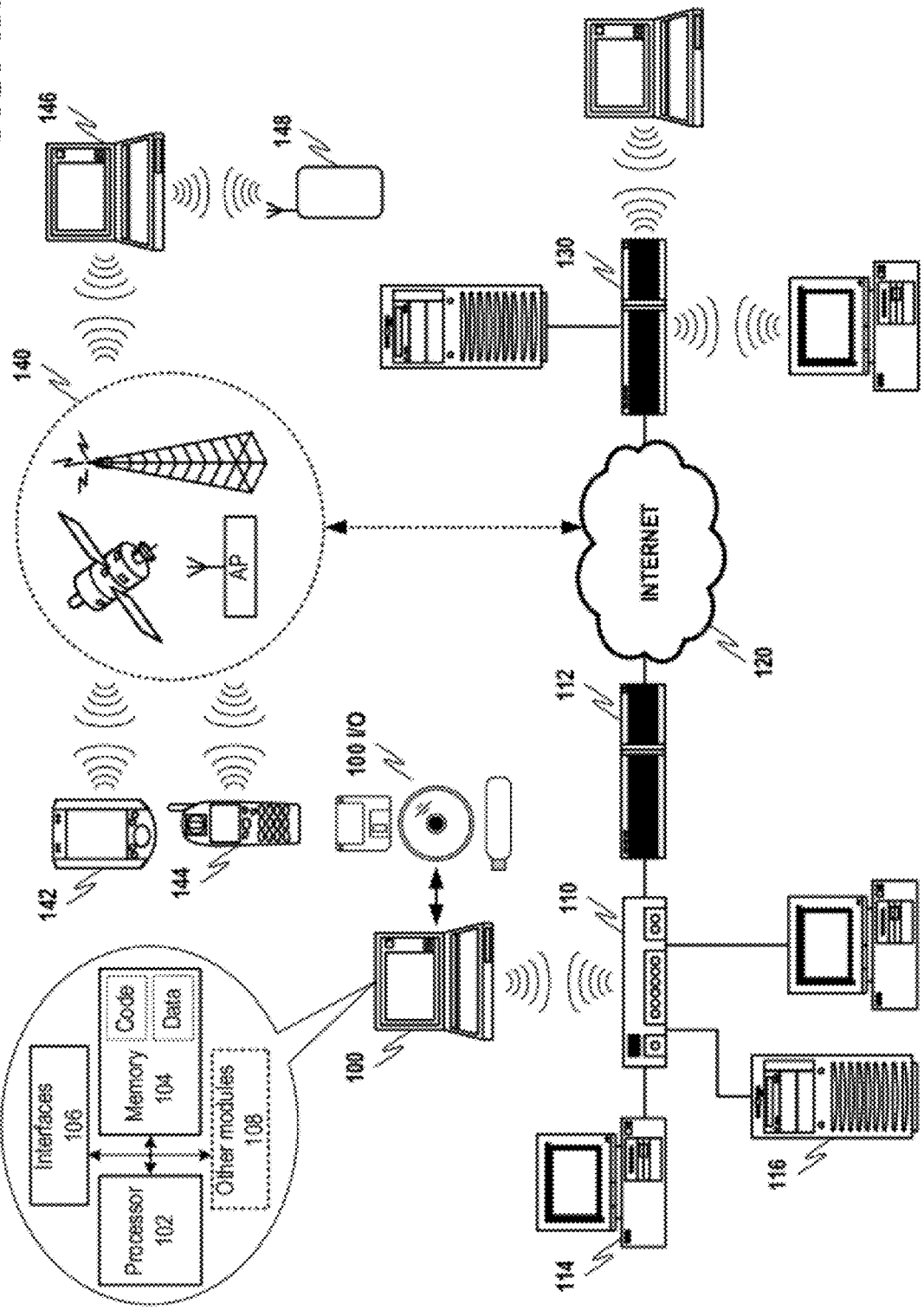
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or embedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface).

These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface.

Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Memory Access Configuration

Figure 2:
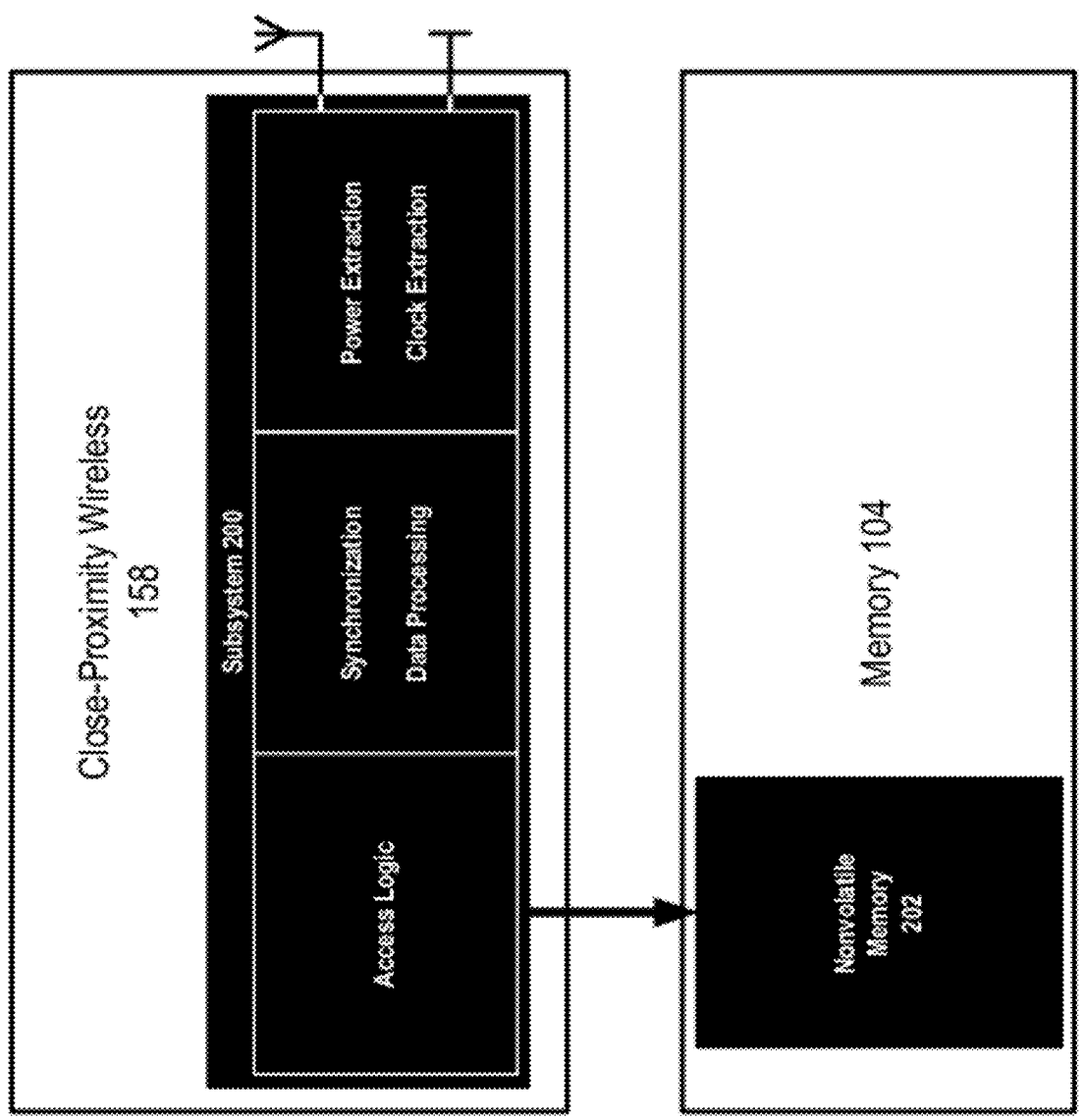
FIG. 2 discloses an example wireless memory access chipset in accordance with at least one embodiments of the present invention.

In accordance with at least one embodiment of the present invention, FIG. 2 discloses example subsystem 200 implemented within close-proximity wireless interfaces 158. Subsystem 200 represents an example of an emerging group of communication technologies that supports ultra fast data transfers, even when the apparatus in which the technology has been implemented is inactive. High speed wireless interaction is made possible by recent progress in nonvolatile memory technology with respect to memory density and power efficiency that opens up new applications such as remote powered communication through wireless power transfer. In the instance of mobile devices the battery may even be detached from the apparatus as the power needed to drive the access circuitry may be derived exclusively from received wireless signals.

Subsystem 200 may be a single integrated circuit solution, or alternatively, may comprise multiple hardware and/or software elements that allow it to extract both power and clock timing from one or more received wireless signals. The extracted power may be used in driving operations in subsystem 200 for synchronization (e.g., to the extracted clock timing) and for data processing pertaining to incoming and outgoing wireless messages. Nonvolatile memory 202 (in memory 104) may then be accessed through access logic also within subsystem 200, wherein access may include high speed read-only and read-write transactions. For example, subsystem 200 may be configured to communicate using a radio technology like Ultra Wide Band (UWB) while being simultaneously powered by a separate UHF remote powering and clocking signal.

Technology such as implemented in subsystem 200 may allow software changes to be implemented at points further along the distribution chain that before were too cumbersome to consider. For example, the wireless communication of software and content to devices when the battery is detached may enable the firmware uploads and service distributions at the point of sale (possibly while devices are still in the box) and may enable mass customization by delaying the due date for final software revisions, allowing the factory to concentrate on turning out new hardware. New user functionality may also become available, allowing for wireless exploration and sharing in device-to-tag and device-to-device transactions. For example, sharing multimedia may be made easier in a localized and network independent way to distribute media resulting in "ubiquitous media" as a new way of sharing information. Applications and content may now be written to devices at retail sellers, allowing for device customization at purchase. Characteristic operation similar to near field communication (NFC) may be experienced, but with substantially faster transaction speeds. For example, sharing by touch (e.g., by touching apparatuses) may be enhanced by high data rates so that larger amounts of data may be transacted in a shorter time.

III. Example Apparatus Configurations

FIG. 3 discloses an example implementation of subsystem 200 in apparatus 300. In accordance with various embodiments of the present invention, apparatus 300 may be any of the example wireless-enabled devices disclosed in FIG. 1A. In a basic configuration, apparatus 300 may comprise at least processor 102, nonvolatile memory 202 and subsystem 200, which may be comprised of one or more individual software and/or hardware components. Processor 102 may interact with nonvolatile memory 104 via a primary memory interface, which may include, for example, the primary communication bus for conveying information within apparatus 300. Processor 102 may also interact with subsystem 200 via a control interface, such as a high speed interface (HSI) or serial peripheral interface (SPI), and interrupt requests (IRQ), or via another compatible interface. The interfaces disclosed in FIG. 3 are meant only for the sake of example, and are not intended to limit the embodiments of the present invention to implementation with only certain communication or interface technologies. Further, a wired/wireless interface may also exist between subsystem 200 and nonvolatile memory 202. Upon receipt of a power/clock signal (e.g., via UHF wireless transmission) and a wireless communication signal (e.g., via UWB), subsystem 200 may become active and may provide access to nonvolatile memory 202.

As previously mentioned, the ability to gain direct wireless access to nonvolatile memory in an apparatus without having to activate the apparatus and without having to remove the memory has a variety of beneficial applications. However, this access could be problematic if provided in an unsecured manner. For example, multifunction apparatuses such a smartphones may, in addition to their operating software, contain information that is sensitive or confidential such as personal information about the user, login names, passwords, etc. Given the high data transfer rate of wireless solutions such as presented herein, a complete download of sensitive or confidential information may occur almost instantaneously. An apparatus would only have to be out of the control of the user for moments before the information is compromised. Moreover, it may be possible for software essential to the operation of an apparatus to be altered or corrupted, or for malicious programs to be loaded onto an apparatus in equally short a time. Therefore, it is apparent that some sort of access control solution is necessary to prevent unauthorized accessing.

Existing access control solutions may be software based. For example, a program in an apparatus may be utilized in configuring security permissions for memory access, and then the configured program may integrate with the operating system and/or other software programs in the apparatus to manage access to data storage locations. These data security implementations are adequate for existing situations, but do not adequately address functionality such as provided by subsystem 200 where nonvolatile memory 202 may be accessed when an apparatus is inactive and possibly without any power source (e.g., no battery). In such situations no operating system software is active in the apparatus, and thus, no protective software may be executed to restrict memory access. A solution is therefore needed that does not rely upon apparatuses being active.

IV. Example Access Control Configuration

Figure 4C:
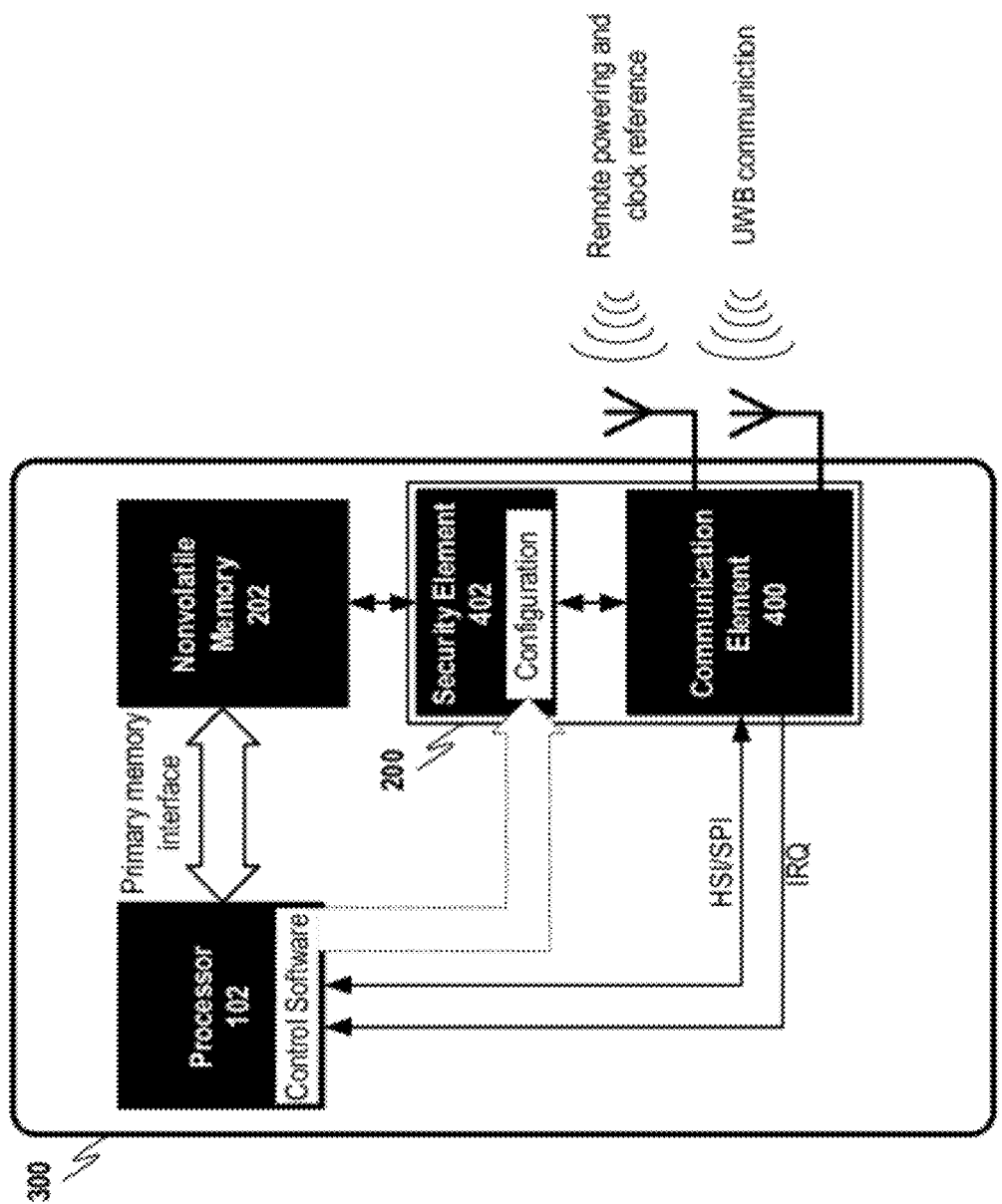
FIG. 4C discloses a third example of configuring an access control configuration and establishing the access control configuration in an access subsystem in accordance with at least one embodiment of the present invention.

In accordance with at least one embodiment of the present invention, example access control configurations that do not rely upon the apparatus being active to restrict memory access are now disclosed with respect to FIG. 4A-4C. The various example implementations are based on the premise of configuring a subsystem access control configuration when an apparatus is active, storing the subsystem access control configuration, and then establishing the subsystem access control configuration in the subsystem upon activation of the subsystem in an external access mode. In the example embodiment shown in FIG. 4A control software may be executed by processor 102 when apparatus 300 is active. Control software may, for example, comprise an executable program that allows apparatus users to configure memory access parameters so that only certain areas of nonvolatile memory 202 (e.g., certain memory address ranges) may be accessed by subsystem 200. It may also be possible for users to configure how memory address ranges may be accessed, such as whether information may only be read from memory (e.g., read-only access) or whether information may also be written to memory (e.g., read-write access). After configuration by the control software is complete, the access parameters can be stored in the form of an subsystem access control configuration, which may also be referred to herein as the "configuration" when describing the example implementations shown in FIG. 4A-4C.

The manner in which the configuration is stored and then later established in subsystem 200 may vary. In the example disclosed in FIG. 4A the configuration may be stored in nonvolatile memory 202 when apparatus 300 is still active, such as after the control software creates or updates the configuration. The configuration may then be established in (e.g., loaded into) subsystem 200 at the next activation. For example, remote power and clock reference may activate subsystem 200 in otherwise dormant apparatus 300, and the receipt of this signal may cause the configuration to be loaded from nonvolatile memory 202 into subsystem 200 as part of the initial activation (e.g., boot-up) of subsystem 200. Access requests may then be received by subsystem 200 and may be checked against the most recent configuration. Access to nonvolatile memory 202 may be granted if the requested access is permitted by the configuration.

FIG. 4B discloses an alternative implementation in accordance with at least one embodiment of the present invention where the configuration is actually stored in subsystem 200. In such a configuration subsystem 200 may have built-in nonvolatile memory such as a FLASH component or another similar rewritable nonvolatile information storage structure. A user may utilize the control software being executed by processor 102 to configure access parameters for nonvolatile memory 202, and these parameters may be used to create a configuration that is written directly to subsystem 200. This configuration may speed up access as the configuration is already present in subsystem 200, and may be loaded more quickly upon activation. However, it also requires that subsystem 200 incorporate nonvolatile memory for storing the configuration, which may, in some instances, require hardware changes, a more expensive implementation, etc.

FIG. 4C shows an example implementation that, in accordance with at least one embodiment of the present invention, includes at least two elements in subsystem 200. Security element 402 may interposed between communication element 400 and nonvolatile memory 202. Subsystem 200 may be comprised within a single integrated circuit providing the functionality of both components, or may include discrete physical elements for communication component 400 and security element 402. Security element 402 may be implemented utilizing protocols such as employed in NFC communication. Due to the additional security layer, it is possible to provide wider/different access rights to nonvolatile memory 202 via subsystem 200 than what is allowed in the embodiments of FIG. 4A-4B. For example, when access control in security element 402 is active, the address limiter may be deactivated. Wider access rights may be more appropriate for technicians operating in customer support. Security element 402 becomes especially relevant in instances where apparatus 300 is turned off. Otherwise, when activated, it may be possible to negotiate the access rights with the control software running in processor 102 so as to configure extended access rights for subsystem 200. The updated configuration may then be written to nonvolatile memory 202 or subsystem 200 (e.g., security element 402) depending on the system implementation. In FIG. 4C, a configuration may be written to security element 402 after being created/updated by the control software in processor 102. Access to nonvolatile memory 202 may then be managed by security element 402. For example, subsystem 200 may receive requests for accessing different memory locations, and the requests may first be checked against the configuration before security element 402 grants access to nonvolatile memory 202.

An example of how nonvolatile memory 202 may be organized, as well how the memory may be accessed, is disclosed in FIG. 5. Initially, a small subsystem configuration area may be reside in nonvolatile memory 202. Operating system data for the apparatus, and for applications installed on the apparatus, may occupy some of nonvolatile memory 202, which may be followed by a portion for user data. In accordance with at least one embodiment of the present invention (e.g., as set forth in FIG. 4A), subsystem 200 may be able to read information from the subsystem configuration data section of nonvolatile memory 202 in order to upload the subsystem access control configuration for use during external access control. While a large amount of user data may be stored in the apparatus, only a small portion of the user data (e.g., the shaded sections of nonvolatile memory 202 in FIG. 5) may be accessible to subsystem 200 as defined within the subsystem access control configuration. These accessible sections of user data may be defined in various formats, such as one or more address ranges in a nonvolatile memory. As further disclosed in FIG. 5, the example address ranges may each be allowed separate access privileges, such as read-only access for retrieving data or "full access" allowing data to be read from, and written to, these locations.

Figure 6:
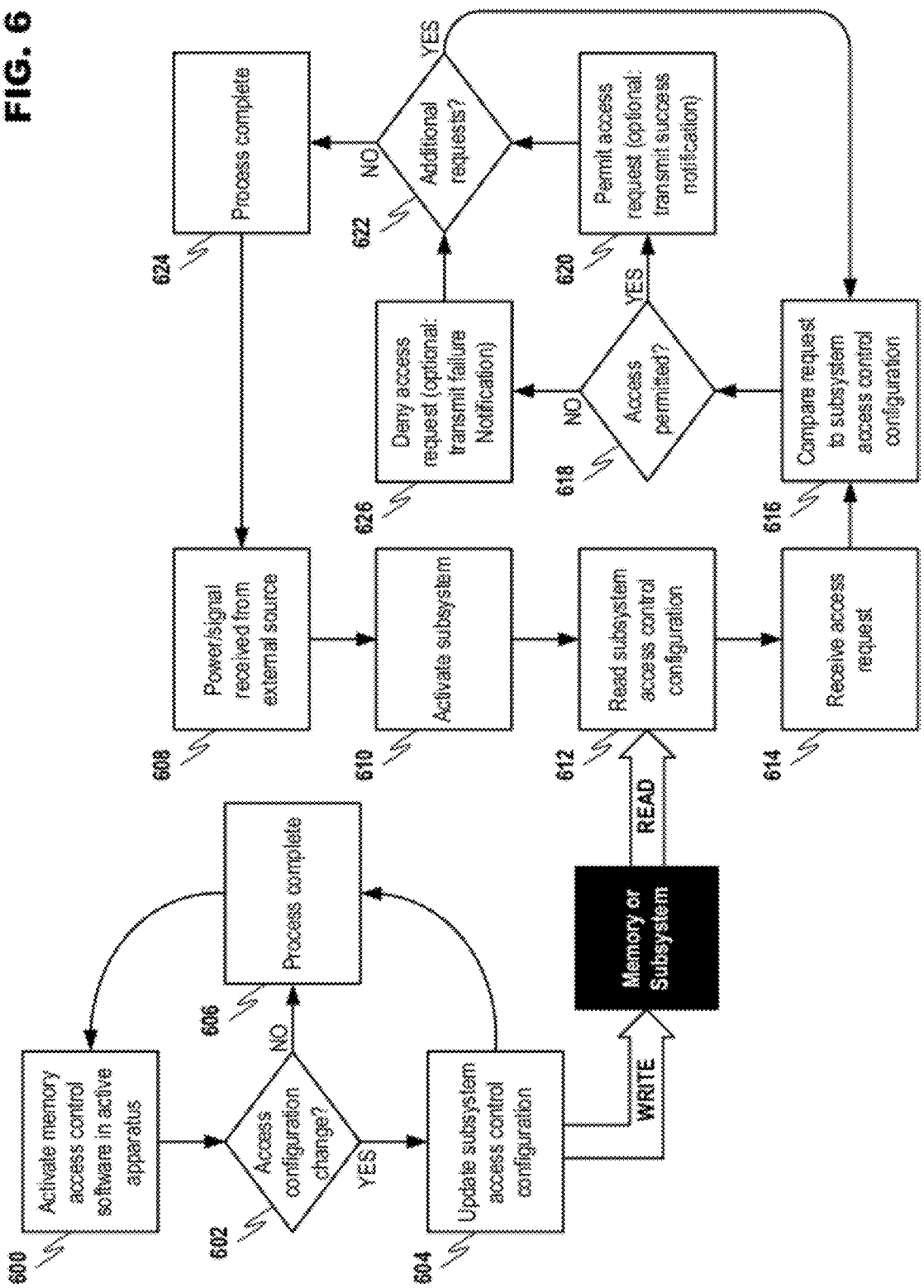
FIG. 6 discloses flowcharts of example access configuration and access control processes in accordance with at least one embodiment of the present invention.

Flowcharts of example processes, in accordance with at least one embodiment of the present invention, are disclosed in FIG. 6. An example process for establishing a subsystem access control configuration in an apparatus is disclosed in steps 600-606, while an example of a memory access control process is disclosed in steps 608 to 622. The subsystem access control configuration must be created before it can be utilized in controlling memory access, and so in step 600 access control software may be activated in an active apparatus. A determination may then be made in step 602 as to whether an access configuration change has occurred as a result, for example, of changes made by users, technicians, etc. Example access configuration changes may include the access privileges being relaxed (e.g., access is permitted for a larger portion of the memory or write privileges for existing permitted memory address ranges are allowed) or the access privileges being constrained (e.g., access is reduced to read-only, or is totally restricted for certain address ranges). If a determination is made that an access configuration change has occurred, then the subsystem access control configuration may be updated. As shown in FIG. 6, in accordance with various embodiments of the present invention step 604 may comprise writing the subsystem access control configuration to a nonvolatile memory or to the subsystem (e.g., to an intermediary security element) depending on the particular implementation. Regardless of whether the subsystem access control configuration is updated in step 604, or no update is deemed to be needed in step 602, the process may then be complete in step 606 and may return to step 600 in preparation for the next activation of the access control software in the apparatus.

The process set forth in steps 600-606 requires the apparatus to be active so that software may be executed and interacted with by a user of the apparatus. The process set forth in steps 608-622 now presumes that the apparatus is inactive (e.g., powered down and/or possibly physically detached from any power source like a battery). In step 608 a wireless power signal and/or communication signal may be received by the subsystem that provides external access to memory in the apparatus. In step 610 the subsystem may be activated (powered) by the received wireless power/clock signal, and in step 612 the subsystem access control configuration may be established in the subsystem. In accordance with various embodiments of the present invention, examples of establishing the subsystem access control configuration in the subsystem may comprise reading it from a nonvolatile memory in the apparatus, reading it from a memory in the subsystem itself, or through the activation of an intermediary security element that contains the subsystem access control configuration. The process may then proceed to step 614 where an access request may be received in the apparatus through the subsystem. The subsystem may then compare the received access request to the subsystem access control configuration in step 616. The comparison may entail, for example, checking the requested memory addresses to be accessed and the requested type of access (read/write) for the memory addresses to the memory address ranges and permitted operations set forth in the subsystem access control configuration. A determination may then be made in step 618 as to whether the requested access is permitted. If access is determined to be permitted, the process may proceed to step 620 where the requested access is permitted. Optionally, the subsystem may transmit a wireless success notification back to the external source of the request. The process may then be complete in step 622 and may return to step 608 in preparation for the next receipt of power/communication signals by the subsystem. Otherwise, if a determination is made in step 618 that the subsystem access control configuration does not permit the requested access, then access may be denied in step 624. Optionally, the subsystem may transmit a wireless access failure notification to the source of the external access request. The process may then terminate in step 622 and may return to step 608 in preparation for the next receipt of power/communication signals.

The various embodiments of the present invention are not limited only to the examples disclosed above, and may encompass other configurations or implementations.

For example, example embodiments of the present invention may encompass apparatuses comprising means for activating a subsystem in an apparatus for providing access to a memory also in the apparatus, means for establishing a subsystem access control configuration in the subsystem in response to the activation, means for receiving in the subsystem a request to access the memory, means for comparing the access request to the subsystem access control configuration, and means for, if the access request is permitted by the subsystem access control configuration, allowing access to the memory in accordance with the access request.

At least one other example embodiment of the present invention may include electronic signals that cause apparatuses to activate a subsystem in an apparatus for providing access to a memory also in the apparatus, establish a subsystem access control configuration in the subsystem in response to the activation, receive in the subsystem a request to access the memory, compare the access request to the subsystem access control configuration, and if the access request is permitted by the subsystem access control configuration, allow access to the memory in accordance with the access request.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   activating a subsystem in an apparatus for providing access to a memory also in the apparatus;
   establishing a subsystem access control configuration in the subsystem in response to the activation,
   wherein the subsystem access control configuration comprises access parameters for use in determining, by the subsystem, when the apparatus is inactive, whether to grant a request for accessing the memory of the apparatus received by the subsystem from an external source while the apparatus is inactive;
   receiving in the subsystem a request to access the memory while the apparatus is inactive;
   comparing, by the subsystem, the access request to the access parameters of the subsystem access control configuration; and
   if the access request is permitted by the access parameters of the subsystem access control configuration, allowing, by the subsystem, access to the memory in accordance with the access request;
   wherein establishing the subsystem access control configuration comprises loading the subsystem access control configuration from the memory into the subsystem in response to the activation.

2. The method of claim 1, wherein the subsystem comprises one or more integrated circuits configured to transmit and receive information via wireless communication regardless of whether the apparatus as a whole is active.

3. The method of claim 1, wherein the access parameters of the subsystem access control configuration specifies one or more ranges of memory addresses that may be accessed by the subsystem.

4. The method of claim 3, wherein the access to each of the one or more ranges of memory addresses is specified as either read-only access or read-write access.

5. The method of claim 1, wherein comparing the access request to the access parameters of the subsystem access control configuration further comprises sending a request for access from a communication component in the subsystem to an intermediary security component in the subsystem interposed between the communication component and the memory.

6. The method of claim 1, further comprising transmitting an access success notification via wireless communication; and if the access request is not permitted by the subsystem access control configuration, transmitting an access failure notification via wireless communication.

7. The method of claim 1, wherein the apparatus is inactive when operating system software of the apparatus is inactive.

8. An apparatus, comprising:
   at least one processor; and at least one memory including executable instructions, the at least one memory and the executable instructions being configured to, in cooperation with the at least one processor, cause the apparatus to perform at least the following:
  activate a subsystem in the apparatus, for providing access to a memory also in the apparatus;
  establish a subsystem access control configuration in the subsystem in response to the activation,
  wherein the subsystem access control configuration comprises access parameters for use in determining, by the subsystem, when the apparatus is inactive, whether to grant a request for accessing the memory of the apparatus received by the subsystem from an external source while the apparatus is inactive;
  receive in the subsystem a request to access the memory while the apparatus is inactive;
  compare by the subsystem the access request to the access parameters of the subsystem access control configuration; and
  if the access request is permitted by the access parameters of the subsystem access control configuration, allow by the subsystem access to the memory in accordance with the access request;
  wherein establishing the subsystem access control configuration comprises loading the subsystem access control configuration from the memory into the subsystem in response to the activation.

9. The apparatus of claim 8, wherein the subsystem comprises one or more integrated circuits configured to transmit and receive information via wireless communication regardless of whether the apparatus as a whole is active.

10. The apparatus of claim 8, wherein the access parameters of the subsystem access control configuration specifies one or more ranges of memory addresses that may be accessed by the subsystem.

11. The apparatus of claim 10, wherein the access to each of the one or more ranges of memory addresses is specified as either read-only access or read-write access.

12. The apparatus of claim 8, wherein the at least one memory and the executable instructions being configured to, in cooperation with the at least one processor, cause the apparatus to compare the access request to the access parameters of the subsystem access control configuration further comprises the at least one memory and the executable instructions being configured to, in cooperation with the at least one processor, cause the apparatus to send a request for access from a communication component in the subsystem to an intermediary security component in the subsystem interposed between the communication component and the memory.

13. The apparatus of claim 8, further comprising the at least one memory and the executable instructions being configured to, in cooperation with the at least one processor, cause the apparatus to transmit an access success notification via wireless communication; and the at least one memory and the executable instructions being configured to, in cooperation with the at least one processor, cause the apparatus to, if the access request is not permitted by the subsystem access control configuration, transmit an access failure notification via wireless communication.

14. The apparatus of claim 8, wherein the apparatus is inactive when operating system software of the apparatus is inactive.

15. A computer program product comprising computer executable program code recorded on a non-transitory computer readable medium, the computer executable program code comprising:
  code configured to cause an apparatus to activate a subsystem in the apparatus, for providing access to a memory also in the apparatus;
  code configured to cause the apparatus to establish a subsystem access control configuration in the subsystem in response to the activation,
  wherein the subsystem access control configuration comprises access parameters for use in determining, by the subsystem, when the apparatus is inactive, whether to grant a request for accessing the memory of the apparatus received by the subsystem from an external source while the apparatus is inactive;
  code configured to cause the apparatus to receive in the subsystem a request to access the memory while the apparatus is inactive;
  code configured to cause the subsystem to compare the access request to the access parameters of the subsystem access control configuration; and
  code configured to cause the subsystem to, if the access request is permitted by the access parameters of the subsystem access control configuration, allow access to the memory in accordance with the access request;
  wherein the code configured to cause the apparatus to establish the subsystem access control configuration further comprises code configured to cause the apparatus to load the subsystem access control configuration from the memory into the subsystem in response to the activation.

16. The computer program product of claim 15, wherein the subsystem comprises one or more integrated circuits configured to transmit and receive information via wireless communication regardless of whether the apparatus as a whole is active.

17. The computer program product of claim 15, wherein the access parameters of the subsystem access control configuration specifies one or more ranges of memory addresses that may be accessed by the subsystem.

18. The computer program product of claim 17, wherein the access to each of the one or more ranges of memory addresses is specified as either read-only access or read-write access.

19. The computer program product of claim 15, wherein the code configured to cause the apparatus to compare the access request to the access parameters of the subsystem access control configuration further comprises code configured to cause the apparatus to send a request for access from a communication component in the subsystem to an intermediary security component in the subsystem interposed between the communication component and the memory.

20. The computer program product of claim 15, further comprising code configured to cause the apparatus to transmit an access success notification via wireless communication; and
  code configured to cause the apparatus to, if the access request is not permitted by the subsystem access control configuration, transmit an access failure notification via wireless communication.

21. The computer program product of claim 15, wherein the apparatus is inactive when operating system software of the apparatus is inactive.

22. A system, comprising:
an apparatus; and
at least one other apparatus;
  the apparatus receiving a wireless signal from the at least one other apparatus and activating a subsystem in the apparatus, for providing access to a memory also in the apparatus;

the apparatus further establishing a subsystem access control configuration in the subsystem in response to the activation, wherein the subsystem access control configuration comprises access parameters for use in determining, by the subsystem, when the apparatus is inactive, whether to grant a request for accessing the memory of the apparatus received from an external source while the apparatus is inactive, and receiving in the subsystem a request to access the memory while the apparatus is inactive from the at least one other apparatus via wireless communication; and the apparatus further comparing the access request from the at least one other apparatus to the access parameters of the subsystem access control configuration, and if the access request is permitted by the access parameters of the subsystem access control configuration, allowing, by the subsystem, the at least one other apparatus to access the memory in accordance with the access request;

wherein the apparatus further establishing the subsystem access control configuration comprises apparatus configured to load the subsystem access control configuration from the memory into the subsystem in response to the activation.

23. The system of claim 22, wherein the apparatus is inactive when operating system software of the apparatus is inactive.

* * * * *